United States Patent [19]
Bronson et al.

[11] Patent Number: 5,318,167
[45] Date of Patent: Jun. 7, 1994

[54] CONTROL SYSTEM FOR POWER DRIVEN CONVEYOR LINE

[75] Inventors: Stephen R. Bronson, Warren; Russell W. Kettelson, Drayton Plains, both of Mich.

[73] Assignee: Newcor, Inc., Bloomfield Hills, Mich.

[21] Appl. No.: 59,812

[22] Filed: May 10, 1993

Related U.S. Application Data

[63] Continuation-in-part of Ser. No. 31,179, Mar. 12, 1993, abandoned.

[51] Int. Cl.$^5$ .............................................. B65G 37/00
[52] U.S. Cl. ................................... 198/577; 198/572; 198/781; 198/343.1
[58] Field of Search .................. 198/341, 343.1, 345.1, 198/571, 572, 575, 577, 780, 781

[56] References Cited

U.S. PATENT DOCUMENTS

| | | | |
|---|---|---|---|
| 1,873,940 | 8/1932 | Henderson et al. | 198/783 |
| 3,066,788 | 12/1962 | Christiansen | 198/460 |
| 3,249,065 | 5/1966 | Adams et al. | 198/460 X |
| 3,716,129 | 2/1973 | Sadler, Jr. | 198/781 |
| 3,960,262 | 6/1976 | Henig | 198/781 |
| 4,109,783 | 8/1978 | Vogt | 198/781 |
| 4,150,743 | 4/1979 | Lazzarotti et al. | 198/460 |
| 4,227,607 | 10/1980 | Malavenda | 198/460 |
| 4,264,004 | 4/1981 | Harwick | 198/781 |
| 4,281,756 | 8/1981 | Bruno | 198/460 X |
| 4,341,334 | 7/1982 | Bier | 198/577 X |
| 4,448,638 | 12/1984 | Morgan et al. | 198/781 |
| 4,453,627 | 6/1984 | Wilkins | 198/781 |
| 4,604,704 | 8/1986 | Eaves et al. | 198/460 X |
| 4,605,120 | 8/1986 | Vanderlinde et al. | 198/781 |
| 4,891,568 | 1/1990 | Shibata et al. | 198/460 X |
| 4,919,255 | 4/1990 | Morgan et al. | 198/781 |
| 4,921,092 | 5/1990 | Crawford et al. | 198/460 |
| 5,058,727 | 10/1991 | Jahns et al. | 198/460 |
| 5,070,995 | 12/1991 | Schaffer et al. | 198/460 |
| 5,086,910 | 2/1992 | Terpstra | 198/572 |
| 5,186,308 | 2/1993 | Munro | 198/575 X |

FOREIGN PATENT DOCUMENTS

3215921 3/1983 Fed. Rep. of Germany.
3443944 5/1986 Fed. Rep. of Germany.

*Primary Examiner*—James R. Bidwell
*Attorney, Agent, or Firm*—Flynn, Thiel, Boutell & Tanis

[57] ABSTRACT

A control system for a power driven conveyor line having power driven conveyor zones adjoined end to end. Each conveyor zone includes a single drive motor, a transmission, driven conveying elements extending the length of the conveyor zone, and an adjacent workstation having a designated stopping point located therein. The control system includes a local controller for controlling the operation of one or more conveyor zones via remote command signals, a respective zone controller associated with each conveyor zone for controlling the operation of the conveyor zone in response to the remote command signals, and first and second sensors coupled to each zone controller for detecting different load positions along the conveyor zone. The first sensor detects the load which causes the zone controller to linearly decelerate the motor, and necessarily the load, from a first speed to a second speed. The second sensor, located downstream from the first sensor, detects the load which causes the zone controller to stop the motor via a DC injection braking signal. The load is stopped at the designated stopping point as it reaches the second speed.

19 Claims, 8 Drawing Sheets

CONTROL SYSTEM FOR POWER DRIVEN CONVEYOR LINE

CROSS REFERENCE TO RELATED APPLICATION

This application is a continuation-in-part of copending application Ser. No. 08/031,179 filed on Mar. 12, 1993, now abandoned.

FIELD OF THE INVENTION

This invention relates to an improved control system for a power driven conveyor, and more particularly to a control system wherein discrete proximity switches are used to precisely stop a load at a designated stopping position.

BACKGROUND OF THE INVENTION

Conveyor lines typically perform a wide range of functions in modern manufacturing facilities ranging from simple product delivery systems to integral components of manufacturing processes. At the high end, conveyor lines are tasked with precisely positioning pallets or workpieces at automated manufacturing stations located along the conveyor line. The workpieces are usually fixed to the pallets which are then conveyed to workstations disposed along the conveyor line. However, workpieces themselves may also be conveyed along the conveyor line when feasible.

Workstations are manned by human operators, automatic mechanisms, robots or combinations thereof which perform various manufacturing steps on the workpiece. When a manufacturing workstation is occupied by a human operator rather than automatic or robotic equipment, it is not as critical that a pallet, or workpiece, stop at a precise designated point along the workstation because the operator can adapt to slight positional variances. However, when a manufacturing workstation is comprised of automatic or robotic equipment, or the like, it is critical to the manufacturing operation that the pallet be accurately positioned at a designated location within the workstation prior to performing the desired step because automated manufacturing equipment cannot be made responsive to positional variances without increasing the cost and complexity of such equipment.

To this end, power driven conveyor line systems have been developed which satisfy the automated workstation positioning requirements by strictly controlling the linear position of a pallet or workpiece.

It is known in powered conveyors to stop a pallet (or a workpiece) at a designated stopping point by means of electro-mechanical, hydraulic or pneumatically operated stops which are disposed at specific locations along the conveyor line. These stops prevent pallets from moving forward in the direction of conveyor travel while the remainder of the conveyor line continues to operate. A feature of this continuous line operation is that multiple workstations are permitted to function independently from one another while sharing the same conveyor drive. However, such stops suffer significant impact and abuse, and such impact is also imposed on the load.

Another disadvantage of continuous power driven conveyors is that each power driven roller typically incorporates a "slip" clutch which permits the roller to slip while supporting a stationary pallet. Such slip mechanisms add to the cost and complexity of continuous power driven conveyors. Continuous power driven conveyors also typically operate at relatively low speeds, on the order of 45–60 feet per minute, because of the high impact forces imparted on the stops when pallets are driven into them at any higher rate of speed.

Still another disadvantage of continuous power driven conveyors is that "idle" stations must be provided between each of the workstations along the conveyor line to reduce the time required to transfer pallets into and out of the workstations. Generally, with line speeds at 45–60 feet per minute, it may take up to 10 seconds or more to transfer a pallet from one workstation to another workstation (workstations are typically about six to ten feet apart). The "idle" stations reduce the time required to transfer pallets by queuing a pallet at the entrance of each workstation. This undesirably increases the number of pallets and the cost of the system.

It is also known in the conveyor arts to stop a pallet at a designated stopping point on a conveyor line by means of a servo motor control system such as disclosed in U.S. Pat. No. 4,891,568 issued to Shibata et al. Servo motor control systems provide highly accurate positioning characteristics but with higher incremental costs associated with the necessarily complex control circuitry and positioning equipment.

It is also known in the conveyor arts to control pallets within a control zone via rollers, each driven by separate motors, and a number of sensors, such as limit or proximity switches, positioned along the control zone, as disclosed in U.S. Pat. No. 5,086,910 issued to Terpstra. The use of sensors positioned at the upstream and downstream ends of a zone, and the use of individual roller motors, undesirably increases the cost and complexity of the system.

Accordingly, it is therefore an object of the present invention to provide an improved open loop control system for use with a power driven conveyor system which, in a preferred embodiment, eliminates the need for stops or clutch slipping mechanisms within power driven rollers, and which permits individual powered conveyor sections or zones to be started and stopped while accurately stopping a load at a precise location.

It is another object of the present invention to provide an improved control system for use with a power driven conveyor system which, in a preferred embodiment, permits a conveyor line to be operated at higher line speeds thereby eliminating the need for "idle" positions on a conveyor line.

It is yet another object of the present invention to provide a low cost, highly reliable control system for use with a power driven conveyor system.

Other objects and purpose of the invention will be apparent upon reading the following specification and inspecting the accompanying drawings.

In the described embodiment of this invention, there is provided a control system for a power driven conveyor zone which conveys a pallet, or the like, down a conveyor section having a plurality of conveyor zones adjoined end to end. Each conveyor zone includes conveying elements such as rollers, chains or belts traversing a support frame; a single drive motor for driving the driven elements of the zone; a transmission for coupling an output of the motor to the driven elements; and a station located adjacent the zone. The control system includes: a local controller for controlling a plurality of conveyor zones via a number of control signals, and individual conveyor zone controllers for controlling each respective conveyor zone. The zone controller controls the operation of the conveyor zone in response to the control signals. A first sensor is coupled to the zone controller for signalling when the leading edge of the pallet has entered or is approaching the station position. The zone controller initiates a ramp-down control signal in response to the first sensor signal, and the motor responds to the ramp-down signal by decelerating the driven elements. A second sensor is coupled to the zone controller for signalling when the leading edge of the pallet has reached a designated stopping point. The zone controller, in response to the second sensor signal, de-energizes the motor, and applies D.C. injection braking current to the motor thus stopping the pallet at the designated point.

DETAILED DESCRIPTION

Figure 1:
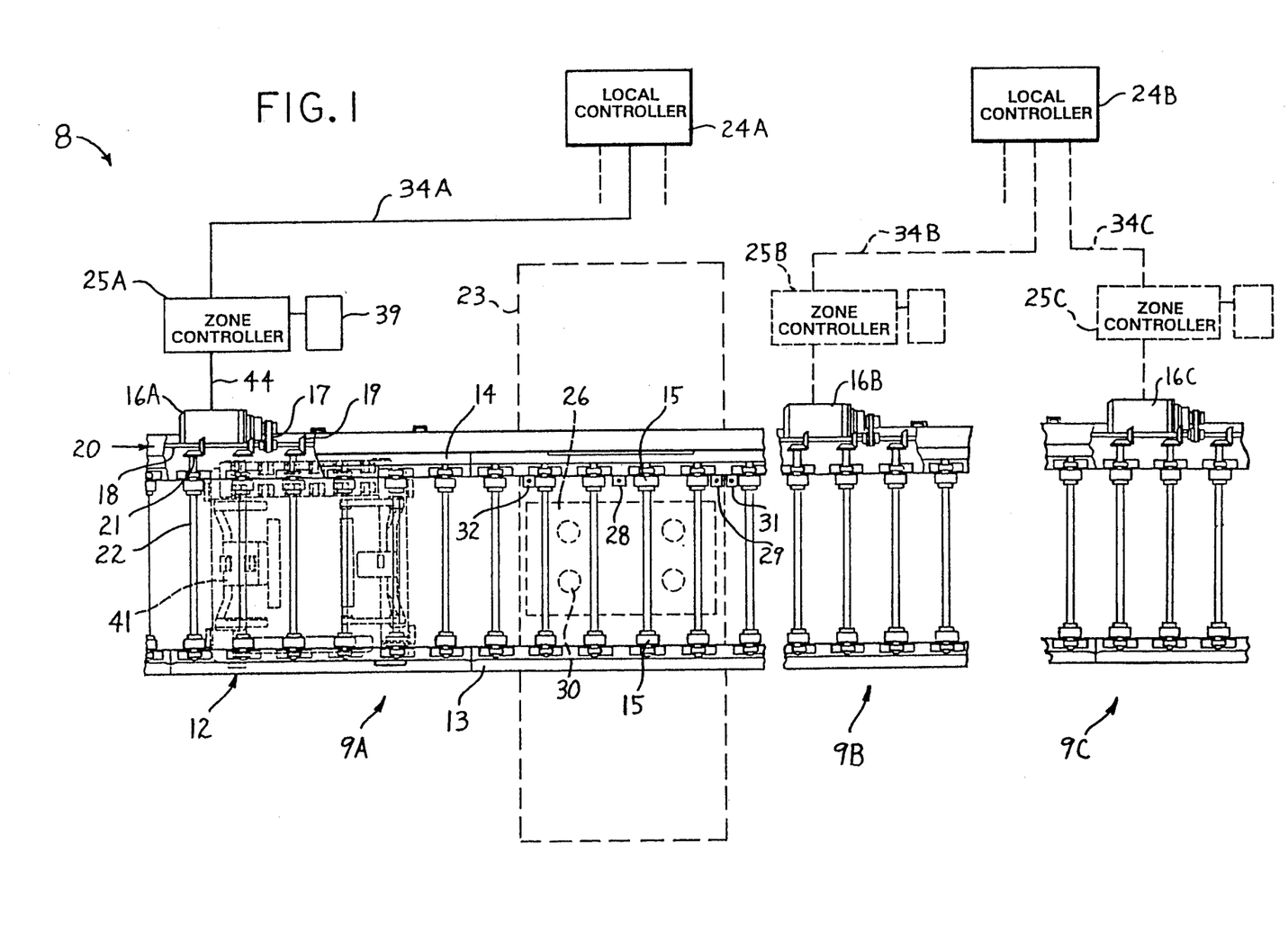
FIG. 1 is a block diagram of a power driven conveyor section which contains local controllers and their associated zone controllers and is illustrated by a top elevation fragmentation view according to a preferred embodiment of the present invention.
Figure 3:
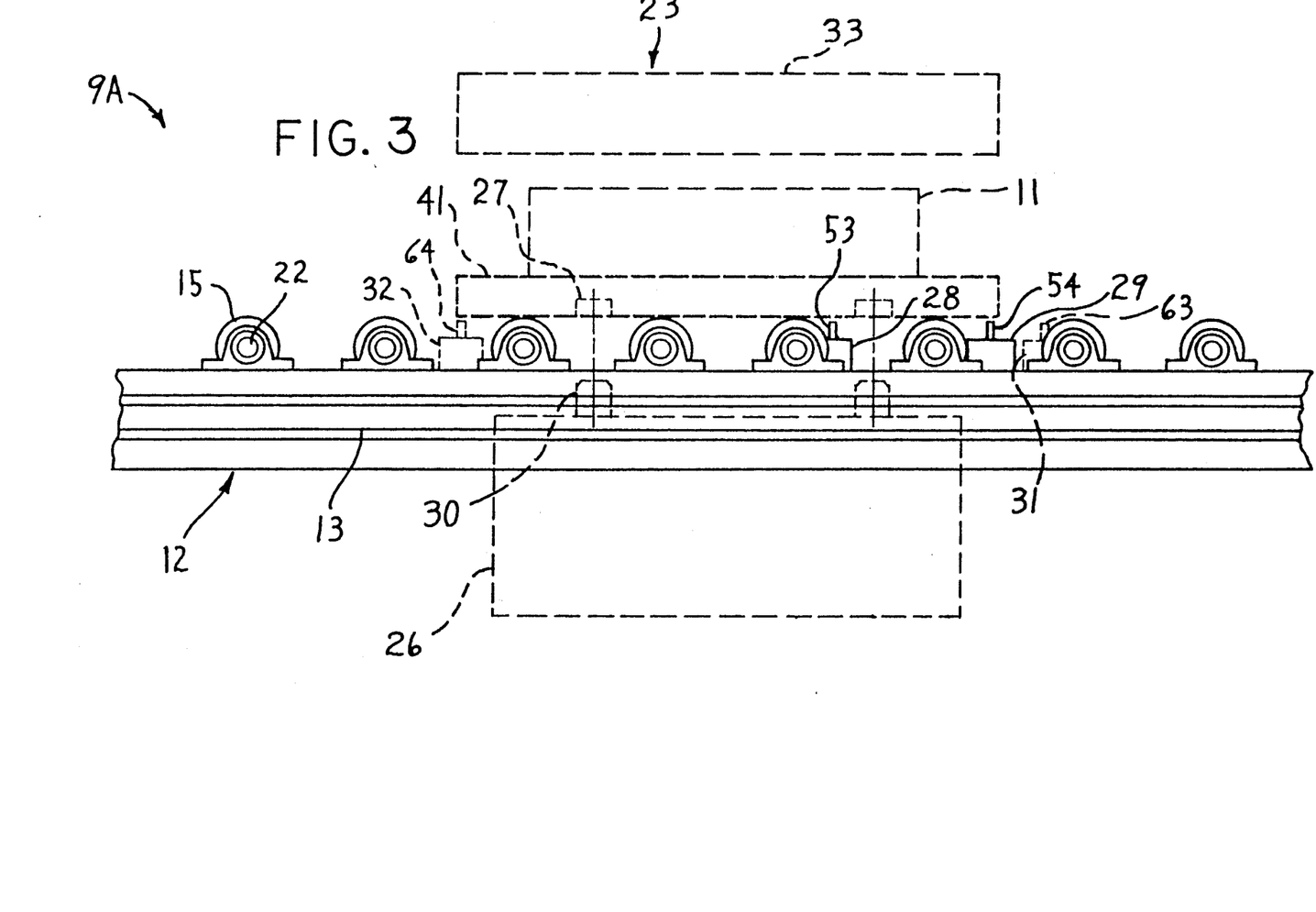
FIG. 3 is a side elevation view of the power driven conveyor illustrated in FIG. 1.

Referring to FIGS. 1 and 3, there is illustrated a power driven conveyor section 8 which includes individual conveyor zones 9A, 9B and 9C adjoined end to end. The conveyor section may comprise any number of adjoined conveyor zones.

Conveyor section 8 can include any number of local controllers 24, two of which are illustrated as 24A and 24B. Local controllers 24A and 24B can respectively control any number of zone controllers 25, three of which are illustrated as 25A, 25B and 25C. Zone controllers 25A, 25B and 25C each control only one conveyor zone 9A, 9B and 9C respectively.

Local controller 24A controls zone controller 25A which is directly coupled to local controller 24A via communications line 34A. Zone controller 25A individually controls conveyor zone 9A.

Local controller 24B controls zone controllers 25B and 25C which are directly coupled to local controller 24B via communication lines 34B and 34C respectively. Zone controllers 25B individually controls conveyor zone 9B while zone controller 25C individually controls conveyor zone 9C.

Conveyor zones 9A, 9B and 9C are of similar structure and function. The following discussion is made with reference to conveyor zone 9A but applies equally to conveyor zones 9B and 9C, etc. Conveyor zone 9A includes a frame 12 having horizontally parallel side rails 13 and 14 and a plurality of adjacently and parallel roller shafts 22 extending perpendicularly between and rotatably supported on side rails 13 and 14. Each roller shaft 22 has a driven gear 21 and one or more conveyor rollers 15 attached thereto. In the preferred embodiment, driven roller shafts 22 have two conveyor rollers 15 fixedly attached to opposed ends of the shaft and located interior to side rails 13 and 14. Conveyor rollers 15 define a horizontal support plane extending longitudinally of the conveyor, and support loads travelling along the conveyor, such as a pallet 41 which fixedly supports a workpiece 11 thereon. Conveyor rollers 15 can also directly support workpieces without the use of pallets.

Conveyor zone 9A includes a single motor 16A for driving the roller shafts 22 via a drive transmission 20. The transmission 20 includes drive mechanism 17 which couples an output shaft of motor 16A to a drive shaft 18, which shaft 18 has drive gears 19 fixedly attached thereto and engaged with driven gears 21 to impart rotational movement to roller shafts 22.

Motor 16A is operated as a variable frequency AC motor. The preferred motor is a standard, three-phase single reduction integral gear motor which is rated at ⅜ HP, 460 volt AC at 1720 rpm. An exemplary motor, manufactured by Sumitomo, is model #HMS-9030-A.

Transmission line 20, in the illustrated embodiment, provides a 14.3:1 gear reduction ratio which drives conveyor line 8 at approximately 110 feet per minute when motor 16 is operated at 1720 rpm.

Conveyor zone 9A can include a station 23 containing automatic or robotic tooling equipment 33 for performing a manufacturing step upon workpiece 11. Tooling equipment 33 can be operated by a human operator or by automated robotic equipment. Station 23 can also include registering jig 26 which is located within side rails 13 and 14 and below driven roller shafts 22. Registering jig 26 contains tapered registering pins 30 which are driven upward into contact with registering receptacles 27 formed on pallet 41 after pallet 41 has been stopped at a designated stopping point. Registering jig 26 can operate to further position and stabilize pallet 41 with respect to tooling equipment 33 by bearing the load of pallet 41 (and workpiece 11). Station 23 may also be a queuing or dwell station for temporarily holding a pallet or workpiece.

Zone controllers 25A, 25B and 25C are of similar structure and function, and therefore the following discussion is made with reference to zone controller 25A but applies equally to zone controllers 25B and 25C etc.

Figure 2:
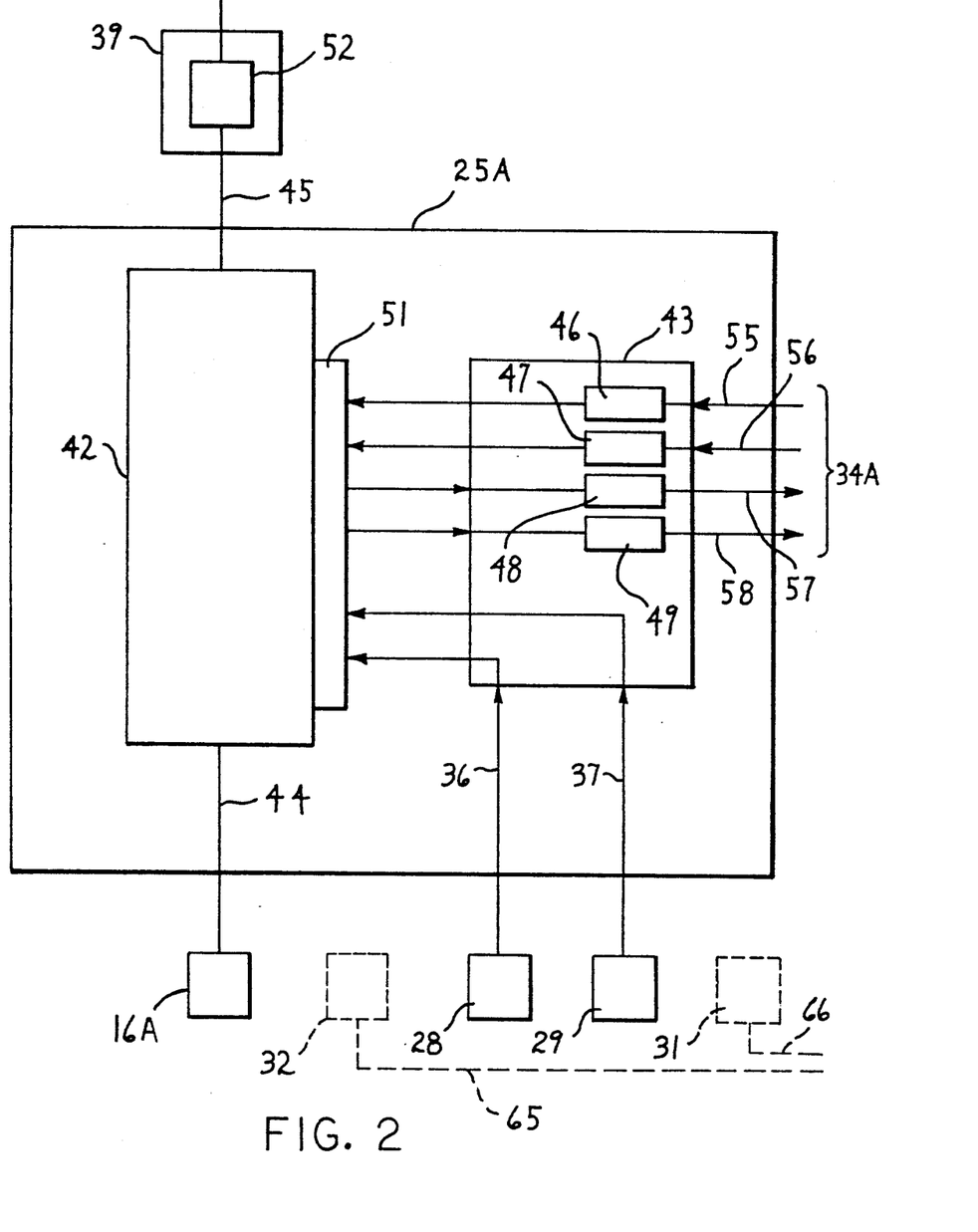
FIG. 2 is a block diagram of the zone controller according to the preferred embodiment of the present invention.

Referring to FIG. 2, there is illustrated a zone controller 25A which includes a variable frequency drive 42, and a relay interface circuit board 43. Variable frequency drive 42 is a standard variable frequency motor controller for controlling the frequency of the three phase AC output power to motor 16A via motor control line 44. An exemplary variable frequency controller, manufactured by Mitsubishi, is the A-200 series, Model #FR-A240-.75K.

Variable frequency drive 42 includes digital input/output interface terminals 51 for communicating with relay interface circuit board 43. Relay interface circuit board 43 includes drive enable relay 46, drive start relay 47, drive running relay 48, and part present relay 49 which couple remote command signals between local controller 24A and variable frequency drive 42 via communication line 34A which comprises individual communication lines 55-58.

Deceleration switch 28 and stop, or pallet present switch 29 are discrete load position sensing switches, preferably proximity switches, optionally mounted on frame 12. A trailing edge detector switch 32 and/or an over-travel switch 31, both preferably proximity switches and optionally mounted on frame 12, are used where automatic equipment requires accurate positioning. Deceleration switch 28 and stop switch 29 are coupled to relay interface circuit board 43. These signals pass through board 43 and are directly connected to digital input/output interface port 51 via lines 36 and 37, respectively. Trailing edge detector switch 32 and over-travel switch 31 are directly coupled to local controller 24A via communication lines 65 and 66, respectively. Switches 28, 29, 31 can 32 can also be photo sensor-type switches, or the like.

Trailing edge detector switch 32 is utilized in conjunction with stop switch 29 when automated equipment is used to perform a manufacturing step on a workpiece mounted on a pallet, but is normally not required when an operator is performing or controlling the manufacturing step.

Optional over-travel switch 31 can be utilized in place of trailing edge detector switch 32 and is normally utilized when automatic or robotic equipment is performing a manufacturing step on certain types of workpieces which are not mounted on a pallet.

With reference to FIG. 3, deceleration switch 28 is preferably located a small distance, such as about 6 to 18 inches upstream of stop switch 29. Trailing edge detector switch 32 is preferably located about one pallet length distance upstream of stop switch 29. Over-travel switch 31 is preferably located a very small distance downstream of stop switch 29. Stop switch 29 is located at a designated stopping point along conveyor section 9A adjacent to station 23, and typically is located so as to define the designated stopping position of the leading end of the load.

In summary, conveyor section 8 as shown in FIG. 1 includes a number of individually adjoined conveyor zones such as zones 9A, 9B and 9C in the illustrated example, each operating under the direction of separate conveyor zone controllers 25A, 25B and 25C, respectively. Each zone controller controls the operation of the respective conveyor zone via motors 16A, 16B and 16C. There can be located within each conveyor zone, an automatic or manual station 23 which performs one or more automatic or manual tasks on a workpiece that has been conveyed to the designated stopping point at the particular conveyor zone.

Operational control of conveyor section 8 will now be discussed. Local controllers 24A and 24B simultaneously or independently activate and deactivate conveyor zones 9A, 9B and 9C comprising the conveyor section 8, thus resulting in simultaneous or independent transfer of pallets into and out of adjacent conveyor zones. The operational control of the conveyor zones 9A, 9B and 9C is similar, and therefore the following discussion is made with reference to conveyor zone 9A but applies equally to conveyor zones 9B and 9C.

Local controllers 24A and 24B are standard programmable logic controllers known in the art to include circuitry and software necessary to control numerous industrial operations. Local controller 24A controls the operation of conveyor zone 9A through remote command signals to zone controller 25A. Local controller 24B controls the operation of 9B and 9C similarly.

Conveyor zone 9A is armed for operation when local controller 24A energizes drive enable relay 46 via communication line 55. Variable frequency drive 42 is armed for operation as long as the drive enable signal is active. The drive enable signal is used for both emergency stop and conveyor fault shutdown of conveyor zone 9A.

Figure 4A:
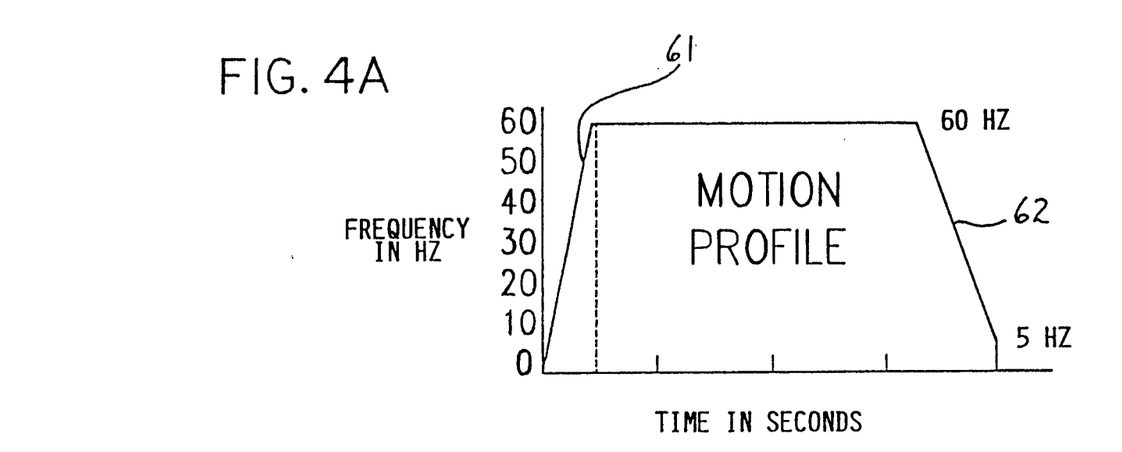
FIG. 4A is a motor control output signal profile from the power driven conveyor zone controller according to the present invention.
Figure 4B:
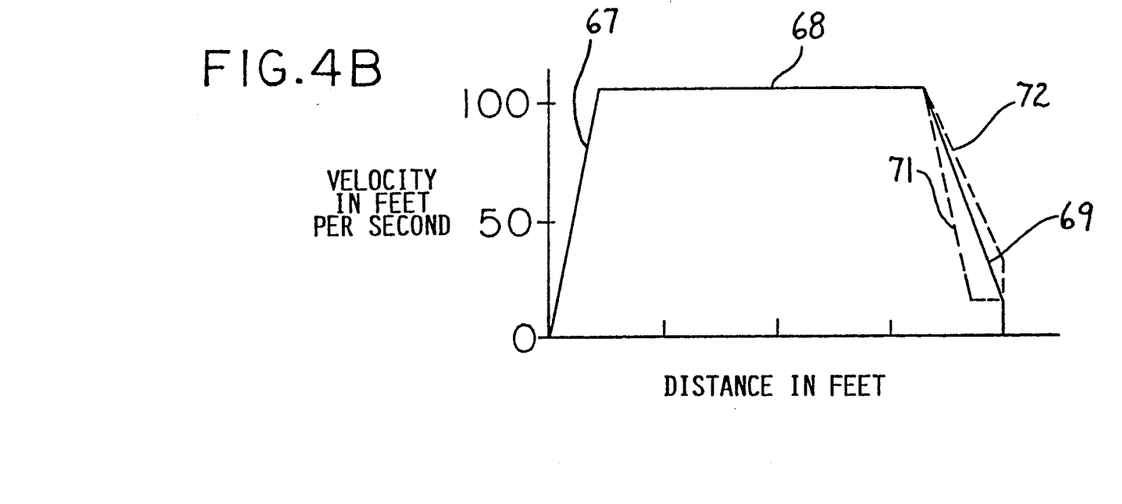
FIG. 4B is a velocity profile for the power driven conveyor load according to the present invention.

With reference to FIGS. 4A and 4B, conveyor zone 9A is activated when local controller 24A energizes drive start relay 47 via communication line 56. Drive start relay 47 signals variable frequency drive 42 which sends a varying frequency motor control signal 61 to motor 16A via motor control line 44. Additionally, variable frequency drive 42 energizes drive running relay 48 to signal local controller 24A that conveyor zone 9A is operating.

Whenever a pallet is present in station 23 of conveyor zone 9A, pallet present relay 49 is energized by stop switch 29. When conveyor zone controller 25A is activated, the pallet is transferred out of station 23 in the following manner. Conveyor zone 9A accelerates 67 the pallet to full speed 68. The variable frequency driver 42 then energizes drive running relay 48, which causes local controller 24A to de-energize start drive relay 47. Conveyor zone 9A is now armed to stop the next pallet entering station 23. As the pallet leaves the zone, by means of driven rollers 15, stop switch 29 is deactivated and pallet present relay 49 is de-energized.

The next pallet entering station 23 travels across deceleration switch 28, which then signals variable frequency drive 42 via line 36. Variable frequency drive 42 begins to linearly ramp down 62 the frequency of the motor control signal during a pre-programmed short time duration which is typically less than one second. The result is a rapid and substantially linear deceleration 69 of motor 16A and conveyor zone 9A from a full or normal line speed to a creep speed which is a small fraction of the normal line speed, this being approximately 5% of the full-speed or about five feet per minute in a preferred embodiment. In the preferred embodiment, the pre-programmed time duration is approximately 0.7 seconds.

Pallet 41 is also rapidly and substantially linearly decelerated from full or normal speed to the creep speed. The linear distance travelled by pallet 41 during programmed deceleration from full-speed to the creep speed corresponds to the distance separating deceleration switch 28 and stop switch 29. As pallet 41 decelerates and reaches the creep speed, it travels onto stop switch 29, which signals variable frequency drive 42 via line 37.

Variable frequency drive 42 responds to the signal on line 37 by removing the variable frequency motor control signal on motor control line 44 and replacing it with a direct current (DC) injection signal to the rotor (not shown) of motor 16A. The DC injection signal causes the rotor windings to polarize and thereby magnetically "lock up" the rotor which, in turn, locks up the motor output shaft.

The result of the above described deceleration is that pallet 41 is stopped to within approximately ±0.03 to ±0.04 inches of a designated stopping point adjacent to station 23. FIG. 4B indicates that pallet 41 preferably triggers stop switch 29 just as conveyor zone 9A has decelerated to the creep speed. Under varying conditions, conveyor zone 9A may reach the creep speed prior to pallet 41 triggering stop switch 29 as depicted by 71, or pallet 41 may trigger stop switch 29 just prior to conveyor zone 9A decelerating to the creep speed as depicted by 72.

Once pallet 41 has been stopped at the designated stopping point, stop switch 29 again energizes part present relay 49 to signal local controller 24A via communication line 58 that a part (i.e. a load) is present in station 23.

If station 23 is being controlled by automated robotic equipment, and workpiece 11 is fixedly attached to pallet 41, a work phase activation device comprised of trailing-edge detector switch 32 and stop switch 29 is activated. The work phase activation device is a redundant positioning device which insures that pallet 41 is indeed positioned correctly at the designated stopping point. Trailing-edge detector switch 32 is positioned approximately one pallet length upstream of stop switch 29. If pallet 41 is properly positioned at the designated stopping point, both switches 32 and 29 will signal the presence of pallet 41. If pallet 41 has travelled past the designated stopping point, then pallet 41 will only be sensed by switch 29, not by switch 32. In operation, once pallet 41 has been stopped, local controller 24A receives a part present signal on communication line 58. Local controller 24A then senses communication line 65 to see if trailing-edge detector switch 32 is signalling the presence of pallet 41. If switch 32 is signalling the presence of pallet 41, the pallet is correctly positioned and the required manufacturing step is performed. If switch 32 is not signalling the presence of pallet 41, the pallet is not correctly positioned and a fault is indicated.

If station 23 is being controlled by automatic or robotic equipment, and a workpiece 11 is conveyed without a pallet, then the over-travel switch 31 is utilized as a redundant positioning device for insuring that workpiece 11 is indeed positioned correctly at the designated stopping point. Over-travel switch 31 is positioned slightly downstream of stop switch 29, with switch 31 typically being located downstream of switch 29 by a small fraction of one inch. If workpiece 11 is properly positioned at the designated stopping point, only switch 29 will signal the presence of workpiece 11. If workpiece 11 has travelled past the designated stopping point, then both switches 29 and 31 will sense workpiece 11. In operation, once workpiece 11 has been stopped, local controller 24A receives a part present signal on communication line 58. Local controller 24A then senses communication line 66 to see if over-travel switch 31 is signalling the presence of workpiece 11. If switch 31 is not signalling the presence of workpiece 11, the workpiece is correctly positioned and the required manufacturing step is performed. If switch 31 is signalling the presence of workpiece 11, the workpiece is not correctly positioned and a fault is indicated.

Over-travel switch 31 is typically used in place of trailing-edge detector switch 32 when directly conveying workpieces, rather than pallets. This is due to the varying length dimensions of the workpieces that are conveyed on the line. It may be difficult to sense proper workpiece positioning by using the trailing-edge detector switch 32 which is fixedly attached to frame 12. In such case it is easier to sense if the leading edge of the workpiece has been conveyed past the designated stopping point as an indication of proper workpiece positioning.

While the powered conveyor illustrated above utilizes a conveying means defined by powered rollers for supporting and transporting loads, it will be appreciated that other types of powered conveying means can be utilized, such as chains, flat belts and V-belts. In an alternative embodiment, the conveying means can be defined by two sidewardly-spaced V-belt arrangements having upper reaches which are horizontally oriented and sidewardly spaced so as to permit a load, such as a gas tank, to be supported on and extend transversely between the V-belts, which belts also permit the tank to project downwardly therebetween with the belts sidewardly confining the tank. Such powered conveyor again permits the loads such as gas tanks to be moved forwardly and then precisely stopped for positioning at a workstation, with a plurality of such V-belt arrangements being generally aligned along the conveyor to define a plurality of powered conveyor zones.

Reference will now be made to FIGS. 5–8 which illustrate a powered conveying system according to a variation of the present invention, in which variation the powered conveying system involves zones employing belt-type conveyors.

Figure 5:
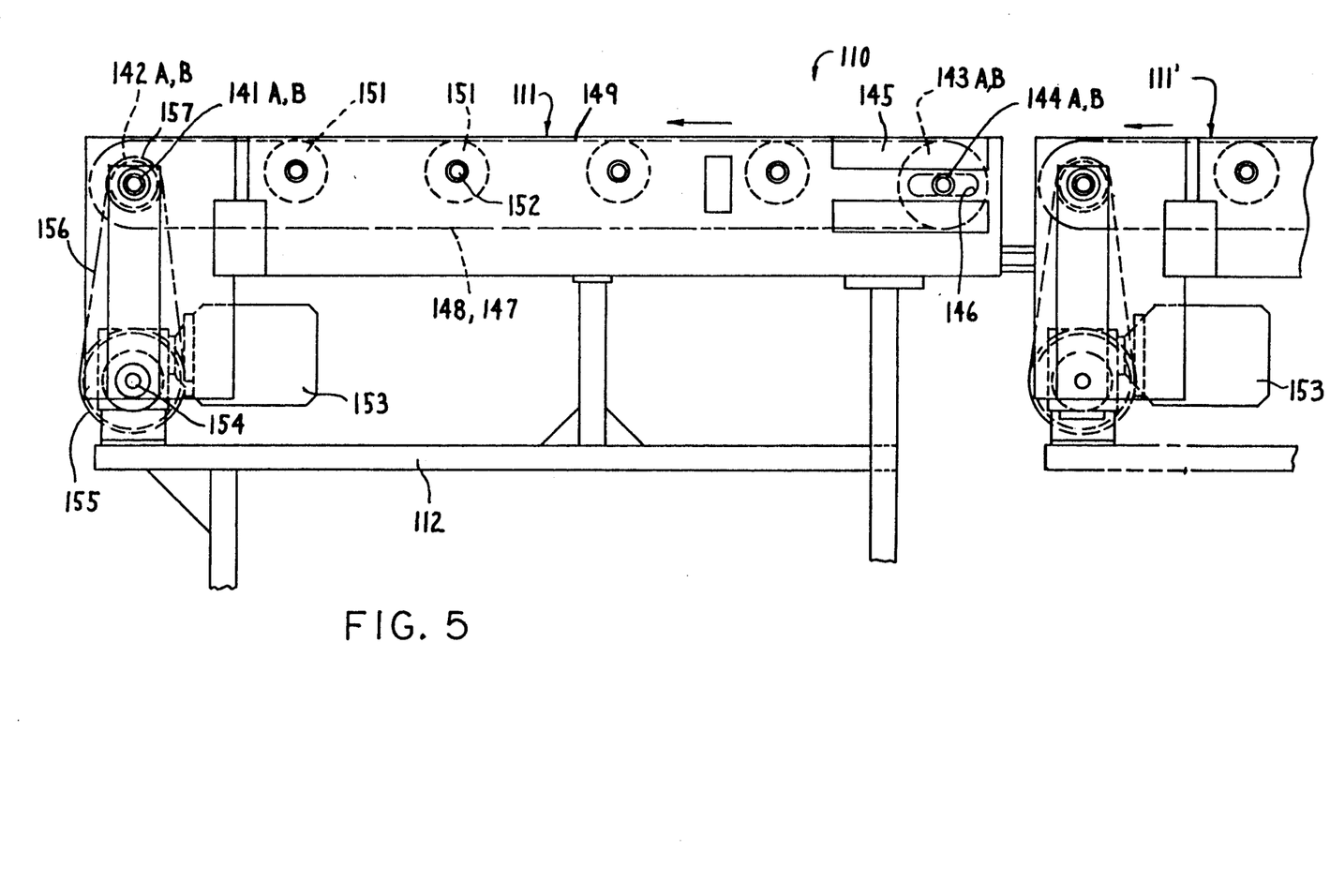
FIG. 5 is a fragmentary side elevational view of a powered conveyor system according to a variation of the invention, which variation involves a belt-type powered conveyor.

More specifically, the powered conveyor 110 according to this embodiment includes a plurality of powered conveyor zones disposed in generally end-to-end relationship, only two such zones 111 and 111' being illustrated in FIG. 5 for convenience of illustration. It will be understood that all of the zones are substantially identical in terms of their function and control, and are utilized for transmitting loads sequentially from zone to zone in generally the same manner as described relative to the embodiment of FIGS. 1–4.

Figure 6:
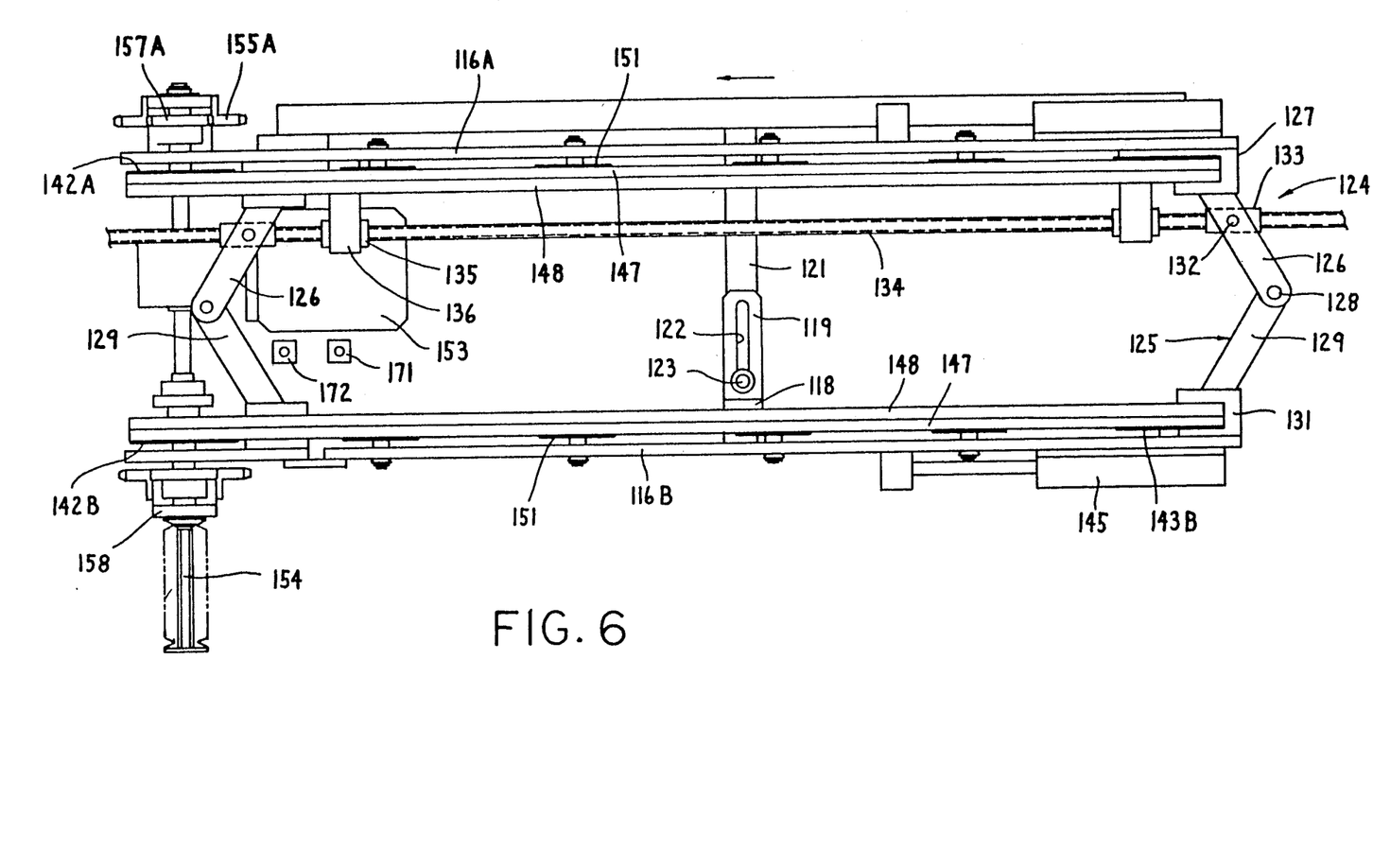
FIG. 6 is a top view of a zone of the conveyor shown in FIG. 5.
Figure 7:
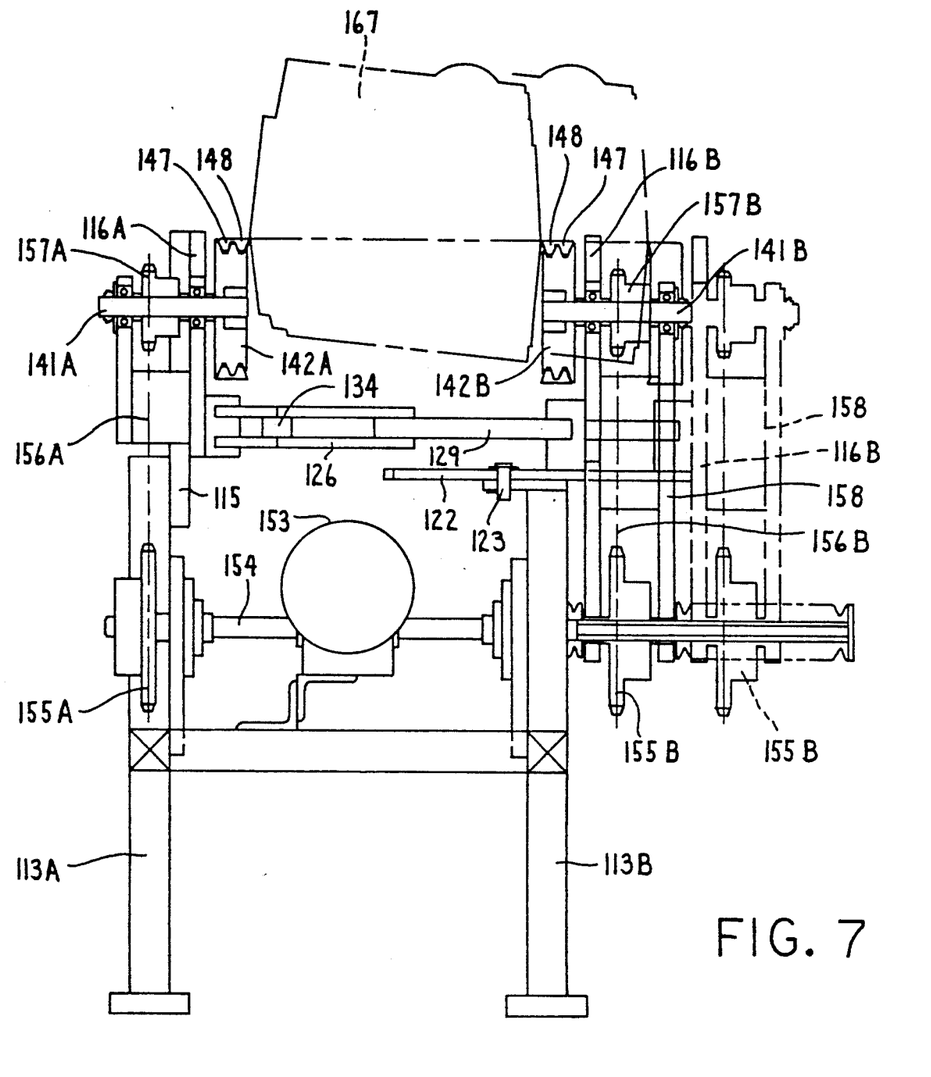
FIG. 7 is an end elevational view of the conveyor zone shown in FIGS. 5 and 6.

The conveyor zone 111 includes a stationary frame 112 having supports or pedestals 113A, 113B adjacent opposite sides of the conveyor. The side supports 113A mount thereon support plates 115 which in turn fixedly secure a horizontally elongate support rail 116A. A further horizontally elongate support rail 116B is disposed adjacent the other side of the conveyor and extends in generally parallel relationship to the stationary support rail 116A. The rail 116B is secured to one or more L-shaped supports 118, the lower leg 119 of which is slidably supported on a top plate 121 associated with the frame. The top plate 121 has a guide pin 122 fixed thereto which projects upwardly into an elongate slot 123 associated with the lower leg 119, thereby guidably supporting the support rail 116B for perpendicular movement toward or away from the other rail 116A while maintaining a generally parallel relationship therebetween to enable the width of the conveyor zone to be adjusted.

To accomplish the width adjustment, an adjustment mechanism 124 is provided and includes a pair of toggle linkages 125 provided adjacent and joined between the adjacent ends of the support rails 116A, 116B. Each toggle linkage 125 includes a link 126 pivotally jointed at one end to a securing block 127 joined to the stationary rail 116A. Link 126 at its other end is joined by a vertical pivot 128 to an adjacent end of a further link 129, the latter at its other end being pivotally joined to a further block 131 which couples to the other rail 116B. Each link 126 also has a vertical pivotal connection 132 to a sleeve 133, the latter being threadably engaged with an elongate screw shaft 134 which extends longitudinally throughout the conveyor in generally parallel relationship with the direction of movement. This screw shaft 134 is supported by suitable bearings 135 secured to brackets 136, the latter being fixed to the stationary support rail 116A.

The screw shaft 134 is provided with a suitable driving device (not shown), such as a crank or drive motor, for permitting selective rotation of the shaft 134 to cause opening or closing movements of the toggle linkages 126 to adjust the width of the conveyor by adjusting the spacing between the support rails 116A and 116B.

Each support rail 116A, 116B, adjacent one end thereof, rotatably mounts thereon a generally horizontal drive shaft 141A, 141B. These drive shafts 141A, 141B are generally coaxially aligned and individually rotatably supported on the respective support rail. Each drive shaft 141A, 141B has an inwardly projecting cantilevered portion on which a respective drive pulley 142A, 142B is nonrotatably supported. Similar driven pulleys 143A, 143B are respectively rotatably supported adjacent the other ends of the support rails 116A, 116B. These driven pulleys 143A, 143B are individually supported on coaxially aligned shafts 144A, 144B which are suitably supported on blocks 145 which are horizontally longitudinally slidable on the respective support rails, with the shafts projecting through elongate slots 146 formed in the support rails, to permit the drive pulleys 143A, 143B to be adjusted toward or away from the drive pulleys 142A, 142B to adjust belt tension.

The pairs of pulleys 142A, 143A and 142B, 143B, are joined together in conveying relationship by a (common body) V belt 147, 148. This belt has horizontally extending upper reaches 149 which are positioned in closely adjacent side-by-side relationship and extend in the longitudinal direction of the conveyor section for transporting loads therealong.

The upper reaches 149 of the belts are supported by a plurality (can simply be a full length "V" groove rail or "U" cut rail if square or round belt is used) of idler pulleys 151 which are disposed in spaced relationship between the drive and driven pulleys, and are suitably rotatably supported adjacent and from the respective support rail 116A, 116B by short cantilevered idler shafts 152.

To effect powered driving of the belts, the conveyor section 111 includes its own drive motor 153 which, through a suitable gear reducer, drives a main drive shaft 154 which is rotatably supported on and extends transversely of the frame. The shaft 154 has a pair of drive sprockets 155A, 155B nonrotatably engaged therewith adjacent opposite sides of the conveyor section, and they in turn drive suitable drive chains 156A, 157B which respectively drive suitable driven sprockets 157A, 157B. These driven sprockets are nonrotatably secured to the respective drive shafts 141A, 141B. The sprockets 155B is axially slidably supported on the main drive shaft 154 and is axially confined between the support rail 116B and a control plate 158, the latter being coupled to and maintained a predetermined distance from the support rail 116B. When the width of the conveyor is varied by effecting movement of the support rail 116B, this also causes a corresponding sideward displacement of the sprockets 155B and 157B so as to not interfere with proper driving of the drive pulley 142B.

Figure 8:
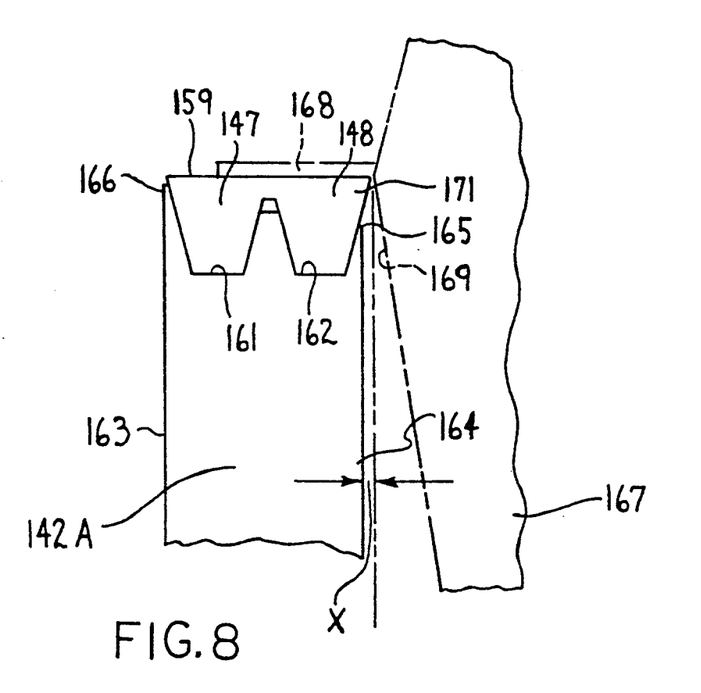
FIG. 8 is an enlarged, fragmentary sectional view showing the relationship between the belts and pulleys.

All of the belt engaging pulleys are, as illustrated by the drive pulley 142A in FIG. 8, provided with a pair of annular grooves 161 and 162 in encircling relationship thereto, which grooves are of a conventional truncated V-shape so as to accommodate therein the single bodied belt 147 and 148, the latter being conventional V belts. The grooves are closely sidewardly spaced so that the exposed faces 159 of the belts are spaced radially slightly outwardly from the outer diameter 166 of the pulley. This outer diameter 166, however, exists only adjacent one end face 163 of the pulley, namely the end face which is disposed on the opposite side from the articles 167 being conveyed. The other end face 164 of the pulley, namely the end face closely adjacent the conveyed articles, is formed such that it terminates in an outer diameter or edge 165 which defines the intersection between the end face 164 and the sloped sidewall of the groove 162, with this edge 165 having a diameter which is significantly smaller than the diameter 166. This edge 165 is hence spaced radially inwardly a significant distance from the exposed face 159 of the belt 147, 148, and results in an inner corner portion 171 of the belt 148 projecting inwardly beyond the end face 164 by a small distance designated "X" in FIG. 8.

With this arrangement, loads or objects 167 to be conveyed can be supported on the sidewardly spaced conveyor belts and closely confined therebetween, while being suspended downwardly therebetween, substantially as illustrated by dotted lines in FIG. 8. More specifically, the object 167 may comprise a hollow tank, such as a gasoline tank, having a surrounding peripheral flange 168 which supportingly engages the exposed faces 159 of the conveyor belts 147, 148 disposed adjacent each side of the conveyor. The spacing between the conveyor belts on opposite sides of the conveyor is adjusted and selected so that the corner portions 171 will resiliently engage the adjacent sidewall 169 of the object to sidewardly confine the objects during transport thereof. At the same time, the natural elastomeric characteristics of the V belts 148 ensures a safe contact with the object so as to prevent damage to the object or to the coating thereof.

Each conveyor zone 111 is provided with suitable senors for controlling the main drive motor 153 of the zone. For example, as illustrated by FIG. 6, the zone 111 is provided with proximity sensors 172 and 173 for sensing the presence of the object 167 and permitting stopping of the conveyor section when the object is in a precise location therealong. These proximity sensors 172 and 173 correspond to the sensors 28 and 29 discussed above, and control the drive motor 153 for the zone 111 in the same manner as described above relative to the first embodiment. Further detailed description of the controls for this second embodiment of the powered conveyor is hence believed unnecessary.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a power driven conveyor which defines a conveyor line having a plurality of powered conveyor zones adjoined end to end for supporting and conveying a load from zone to zone, each said conveyor zone including driven conveying means extending throughout the length of the respective conveyor zone from an input end to an output end thereof, the load being supportable directly on said conveying means for transport along the zone, each said conveyor zone also including a single drive motor means for driving the conveying means, a transmission means for drivingly coupling the drive motor means to the conveying means, and a control system for controlling operation of the conveyor, the improvement wherein said control system comprising:

a local controller for controlling said conveyor zones by a plurality of control signals;

a respective zone controller associated with each said conveyor zone and coupled to the local controller for controlling the respective conveyor zone, each said zone controller including means for controlling the operation of the respective conveyor zone in response to said control signals received from the local controller;

first sensing means associated with each said conveyor zone and coupled to the respective zone controller for signalling when a leading edge of the load has reached a designated deceleration point;

each said zone controller including means for initiating a ramp-down motor control signal in response to the respective first sensing means for decelerating the respective drive motor means;

second sensing means associated with each said conveyor zone and coupled to the respective zone controller for signalling when the leading edge of the load has reached a designated stopping point;

each said zone controller including means for initiating a stop signal in response to the respective second sensing means signal; and     means associated with each said drive motor means for stopping the drive motor means in response to the stop signal.

2. The conveyor according to claim 1, further including a trailing-edge sensing means associated with each said conveyor zone and coupled to the local controller for sensing the presence of the trailing-edge of the load when the load has been stopped at the designated stopping point.

3. The conveyor according to claim 2, wherein the first and second sensing means and the trailing-edge sensing means are proximity switches.

4. The conveyor according to claim 1, further including a workstation associated with a plurality of each said conveyor zones.

5. The conveyor according to claim 1, further including an over-travel sensing means associated with each said conveyor zone and coupled to the local controller for sensing the presence of the leading-edge of the load.

6. The conveyor according to claim 5, wherein the first and second sensing means and the over-travel sensing means are proximity switches.

7. The conveyor according to claim 5, wherein the first and second sensing means and the over-travel sensing means are photo-sensors.

8. The conveyor according to claim 1, wherein said zone controller includes a variable frequency drive for controlling an output frequency to the respective drive motor means.

9. The conveyor according to claim 8, wherein said drive motor means is a variable frequency AC motor.

10. The conveyor according to claim 1, wherein said means for stopping the drive motor means is a DC injection braking signal applied to the respective drive motor means.

11. The conveyor according to claim 1, wherein said second sensing means is positioned at the respective designated stopping point, and said first sensing means is positioned at the respective designated deceleration point.

12. The conveyor according to claim 11, wherein the load is stopped within a distance of about ±0.03 to about ±0.04 of an inch from the designated stopping point.

13. The conveyor according to claim 1, wherein the driven conveying means is a plurality of adjacent and parallel roller shafts each having a conveyor roller mounted thereon.

14. The conveyor according to claim 1, wherein the driven conveying means includes endless belts for supporting the load.

15. A method for controlling and stopping movement of a load at a designated stopping point on a power driven conveyor line having a plurality of powered conveyor zones adjoined end to end for supporting and conveying the load from zone to zone, each said conveyor zone including driven conveying means extending throughout the length of the respective conveyor zone from an input end to an output end thereof, the load being supportable directly on said conveying means for transport along the zone, each said conveyor zone also including a single drive motor means for driving the conveying means, said method comprising the steps of:

generating a deceleration signal when the load has reached a designated deceleration point;

ramping down an output signal frequency to the drive motor means in response to the deceleration signal to decelerate the conveying means;

generating a stop signal when the load has reached the designated stopping point;

generating a DC injection braking signal in response to the stop signal; and     applying the DC injection braking signal to the drive motor means to stop the load at the designated stopping point.

16. The method as claimed in claim 15 further comprising the steps of:

verifying the position of the load at the designated stopping point; and     contacting the load with a relative positioning means to further position the load with respect to a workstation.

17. The method as claimed in claim 15, wherein the load is decelerated from a first speed to a second speed, the second speed being approximately 5% of the first speed.

18. The method as claimed in claim 17, wherein a leading edge of the load reaches the designated stopping point as the load reaches the second speed.

19. The method as claimed in claim 17, wherein the first speed is approximately 110 feet per minute.

* * * * *